United States Patent [19]

Merving

[11] Patent Number: 5,471,784
[45] Date of Patent: Dec. 5, 1995

[54] GAS DISPENSING TAP OR PLUG

[76] Inventor: Hans A. K. Merving, August Stalbergsvag 10A, 644 00 Torshalla, Sweden

[21] Appl. No.: 208,891

[22] Filed: Mar. 14, 1994

[51] Int. Cl.$^6$ .................................................. A01G 29/00
[52] U.S. Cl. .................................................. 47/57.5
[58] Field of Search ........................................ 47/57.5

[56] References Cited

U.S. PATENT DOCUMENTS

| | | |
|---|---|---|
| 1,999,458 | 4/1935 | Hollister . |
| 2,970,404 | 2/1961 | Beaufils et al. . |
| 3,706,161 | 12/1972 | Jenson . |
| 4,308,689 | 1/1982 | Jenson et al. . |
| 4,342,176 | 8/1982 | Wolfe . |
| 4,344,250 | 8/1982 | Fahlstrom . |
| 4,905,410 | 3/1990 | Merving . |
| 5,010,684 | 4/1991 | Merving .................. 47/57.5 |
| 5,207,021 | 5/1993 | Merving .................. 47/57.5 |
| 5,249,391 | 10/1993 | Rodgers .................. 47/57.5 |
| 5,341,594 | 8/1994 | Merving .................. 47/57.5 |

Primary Examiner—Ramon S. Britts
Assistant Examiner—Joanne C. Downs
Attorney, Agent, or Firm—Keck, Mahin & Cate

[57] ABSTRACT

A gas dispensing tap is designed for insertion into a tree bore. The tap includes a hollow container having a side wall, an open end and a closed end. A plug head closes off the open end of the hollow container to define a primary cavity within the hollow container including a first chemical agent. In one embodiment of the invention, the plug head includes a bore or passage provided therein for communicating an interior of the tree bore with an outside of the plug head. A stopper is received in an opening to a secondary cavity in the plug head and closes off the secondary cavity. The secondary cavity contains a second chemical agent. The stopper is moved into the secondary cavity as an impact force is applied to the stopper and combines the first and second chemical agents so that a gas, generated by combination of the chemical agents, diffuses through the side wall and stimulates the flow of sap. Again, in one embodiment of the invention, sap is caused to pass from the interior of the bore or passage, through the bore or passage and to the outside of the plug head due to the stimulated sap flow.

22 Claims, 4 Drawing Sheets

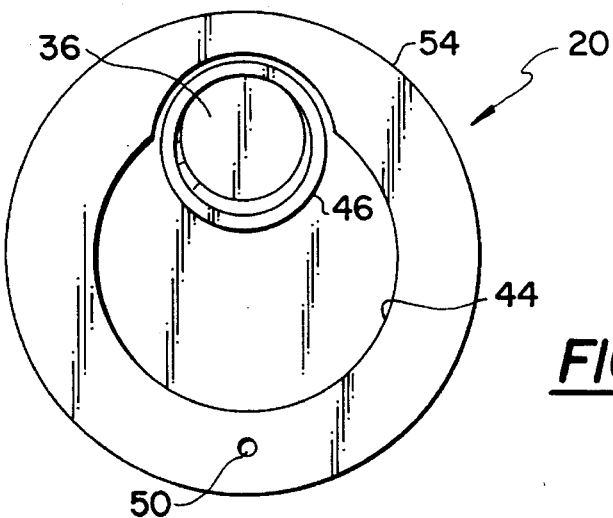
FIG. 3
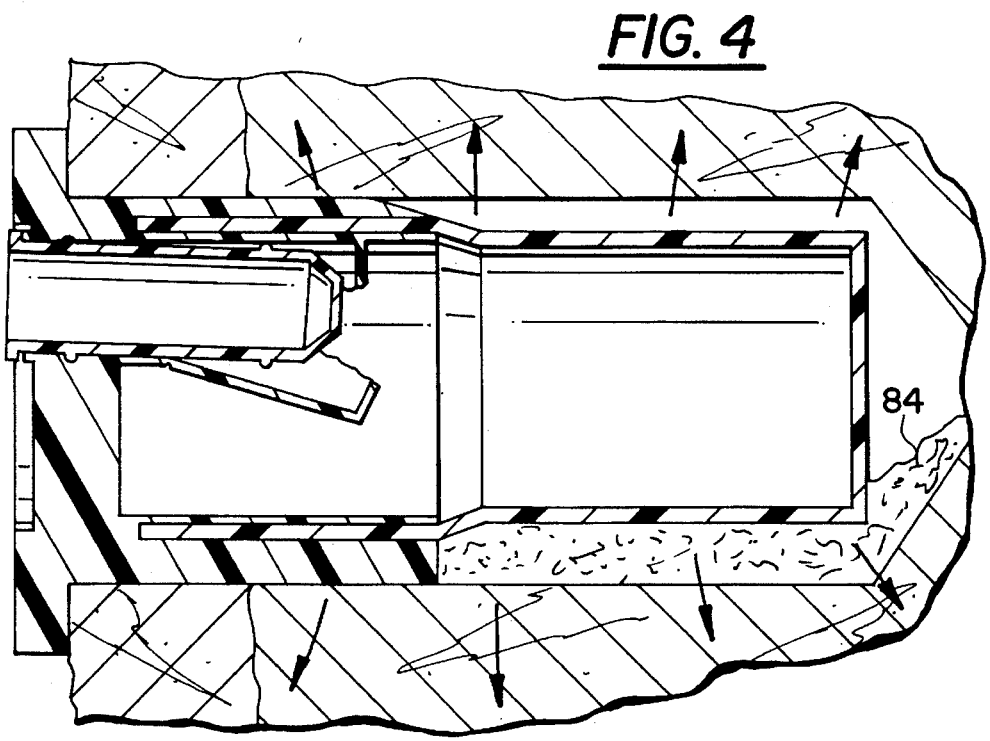
FIG. 4
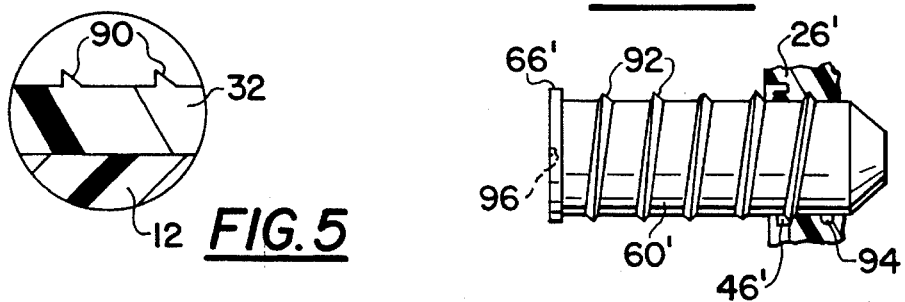
FIG. 5
FIG. 6

GAS DISPENSING TAP OR PLUG

BACKGROUND OF THE INVENTION

1. Field of the Invention

This invention concerns a tap or plug which dispenses gas into trees or other vegetation, e.g., to stimulate the production of sap so that it may be collected for subsequent use or for any other purpose.

2. Description of Related Art

It is desirable to collect the sap of certain types of trees or, possibly, other types of vegetation so that the sap may then be processed. One type of sap commonly considered useful is latex, i.e. the sap of the "spurge" family of trees, which may be coagulated and dried or chemically altered to produce rubber of desired characteristics. Another type of sap commonly considered useful is that from maple trees, which can be processed into syrup, sugar and candy, for example. Taps which are commonly used to provide access to and collect the sap from these types of trees are simply tubes which do not in any way augment the flow of sap and provide no control over the rate of flow of the sap. Other circumstances exist in which it is desirable to introduce into a plant system a material in a gaseous form.

SUMMARY OF THE INVENTION

It is, accordingly, one object of this invention to provide a tap or plug which, when initially inserted into a tree, provides a very limited sap yield and yet, when desired, can be actuated to increase the yield of sap dramatically.

It is another object of this invention to provide a tap or plug which helps to stimulate the flow of sap in a tree so that an increased volume of sap can be collected by another, separately provided, tap of conventional construction.

It is a general object of the present invention to provide a tap or plug that will generate, upon demand, a gaseous material to be injected into or absorbed by a tree or plant, the generation of the gas being effected in a most efficacious manner.

These objects and other objects are achieved by providing a gas dispensing tap or plug which is designed for insertion into a tree bore and which has a particular construction. The tap or plug includes a hollow container having a side wall, an open end and a closed end. A plug head closes off the open end of the hollow container to define a primary cavity within the hollow container including a first chemical agent. In one embodiment of the invention, the plug head includes a bore or passage provided therein for communicating an interior of the tree bore with an outside of the plug head. A stopper is received in an opening to a secondary cavity in the plug head and closes off the secondary cavity. The secondary cavity contains a second chemical agent. The stopper is moved into the secondary cavity as an impact force is applied, upon demand, to the stopper and combines the first and second chemical agents so that a gas is generated by a combination of the chemical agents at a preselected pressure. The gas then diffuses through the side wall and is injected into or absorbed by the tree and, in one example, stimulates the flow of sap. Again, in one embodiment of the invention, sap is caused to pass from the interior of the tree bore, through the bore or passage in the plug head and to the outside of the plug head due to the stimulated sap flow.

BRIEF DESCRIPTION OF THE DRAWINGS

FIG. 3 is a view of the plug head of the tap or plug shown in FIG. 1 as seen in the direction of arrow III.

FIG. 4 is a side sectional view of a sap flow stimulating tap or plug according to the present invention in an active state.

FIG. 5 is an enlarged part sectional view showing barbs provided on the plug head of the tap or plug shown in FIG. 1 or FIG. 4.

FIG. 6 is a side view of an alternative secondary stopper configuration.

DESCRIPTION OF THE PREFERRED EMBODIMENTS

Figure 1:
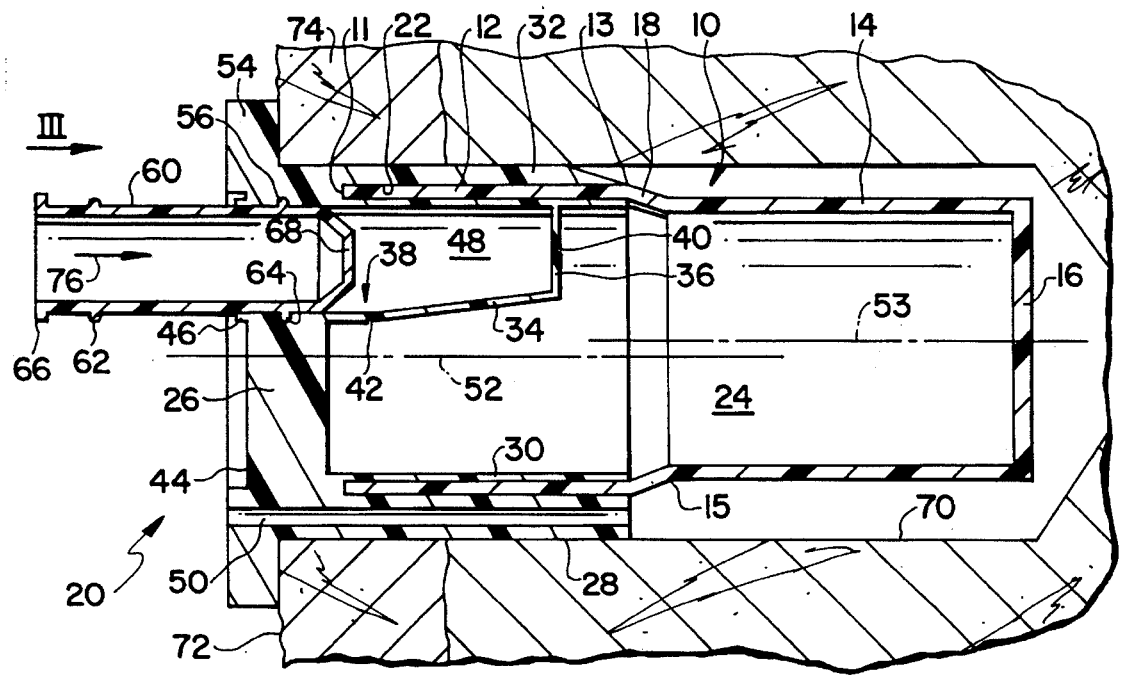
FIG. 1 is a side sectional view of a sap flow stimulating and dispensing tap or plug according to the present invention in an inactive state.

A tap or plug according to the first embodiment of the present invention is shown in FIG. 1 and includes a hollow container 10. The container 10 includes a first, larger diameter cylindrical portion 12 having opposite open ends 11 and 13, a second, smaller diameter cylindrical portion 14 having one open end 15 and an opposite closed off end 16, and an intermediate, conically tapered portion 18 interconnecting the ends 13 and 15 of the first and second cylindrical portions 12 and 14, respectively.

The first, larger diameter cylindrical portion 12 has its open end 11 closed off by a primary plug head 20. More specifically, the open end 11 and at least a substantial section of the wall of the first cylindrical portion 12 are received in and secured by, for example, an adhesive in a recess 22 formed in the plug head 20. A primary or first chemical agent containing chamber or cavity 24 is thus formed within the container 10 and is closed off by the plug head 20 as will be described in more detail presently.

The plug head 20 includes a base 26 and an approximately cylindrical wall 28 upstanding from the base 26. The recess 22 is formed in the cylindrical wall 28 and is sandwiched between a radially inner cylindrical wall part 30 and a radially outer cylindrical wall part 32 of the cylindrical wall 28. The radially outer cylindrical wall part 32 may, if desired, be provided with radially outwardly extending barbs 90 as shown in FIG. 5.

As shown most clearly in FIGS. 1 and 3, secondary chamber walls 34 and 36 are integrally formed with both the base 26 and the radially inner cylindrical wall part 30 of the plug head 20. As shown, the chamber wall 36 is roughly circular. The chamber wall 34 is roughly cylindrical between its junction with the base 26 and a hinge location 38, which will be described later, but tapers between the hinge location 38 and the junction of the chamber walls 34 and 36. The wall 36 may be formed with a diametrically extending notch or kerf 40 therein, while the wall 34 may be formed with a circumferentially extending kerf or notch 42, defining the hinge location 38. In addition to the secondary chamber walls 34 and 36, the plug head 20 includes recess 44, an upstanding flange 46, within the recess 44, surrounding an opening to a secondary chamber or cavity 48 defined by the secondary chamber walls 34 and 36, and at least one bore 50 extending throughout the axial length of the plug head 20, i.e., entirely through both the base wall 26 and the cylindrical wall 28 and in a direction parallel to the central axis 52 of the plug head 20. The central axis 52 is slightly offset from the central axis 53 of the hollow container 10. The plug head 20 additionally includes a flange 54 extending radially outwardly from the base 26 and a circular groove 56 extending circumferentially around the interior of the opening to the secondary cavity 48 for reasons which will become apparent.

A secondary plug head or stopper 60 is used to close off the secondary cavity 48. The secondary plug head or stopper 60 is sized so that it can be tightly received within the opening to the secondary cavity 48 and includes a pair of radially outwardly extending protrusions 62 and 64 passing around the outer circumference thereof. The stopper 60 further has a radially outwardly extending flange 66 located at one end thereof and is closed off by a wall 68 at its other end. FIG. 6 shows an alternative secondary plug head or stopper construction. In the configuration shown in FIG. 6, a stopper 60' is provided with a screw thread 92 on its outer circumference which is received in a helical groove 94 formed in a modified base 26'. The helical groove 94 is used in place of circular groove such as groove 56 shown in FIG. 1. A slot 96 is provided in an outer end of the stopper 60' for reasons which will become clear.

All elements of the tap shown in the drawing figures may be made of plastic material. One example of such a plastic material is polyvinyl chloride (PVC). For reasons which will become clear, however, at least the container 10 is formed of a plastic material which is relatively liquid tight but gas permeable. All parts of the tap may be biodegradable.

Before the end 11 of the cylindrical portion 12 of the container 10 is placed into the recess 22, a portion of the volume 24 is filled with a first chemical agent. The container 10 and the plug head 20 are then secured together, upon inserting the end 11 of the portion 12 into the recess 22, to close off the volume 24 and seal the first chemical agent therein. A second chemical agent is then placed in the secondary chamber 48. The stopper 60 is inserted into the opening leading to the secondary chamber 48 until the protrusion 64 snaps into engagement with the groove 56. An assembled tap is thus produced. The first and second chemical agents are known agents which, when mixed together, react to produce a gas which has been found to stimulate the production of sap in trees. Once the protrusion 64 has snapped into engagement with the groove 56, the second chemical agent is completely contained in the cavity 48 and is isolated from the first chemical agent, which is completely contained in the cavity 24. Each of the first and second chemical agents may be in powder, gel or liquid form.

To use the tap of the present invention, a bore 70 of appropriate size is initially drilled or otherwise formed through the outer bark and phloem layers of a tree from which sap is to be collected. The tap is then inserted into the bore 70 until the flange 54 abuts against the outer surface 72 of the outer bark layer 74. The barbs 90, if used, help to retain the tap within the bore 70. The bore 50 forms communicating means for communicating an interior of the bore 70 with an outside of the plug head 20 and, at this point, a small amount of sap will be permitted to flow through the bore 50 to the exterior of the tree. Subsequently, an impact force is applied to the end of the secondary stopper 60, causing it to move inwardly in the direction of arrow 76 into the secondary cavity 48 containing the second chemical agent. Movement of the stopper 60 in the direction of the arrow 76 will terminate when the protrusion 62 snaps into engagement with the groove 56 and the flange 66 abuts the upstanding flange 46. If a stopper 60' of the modified construction is used, a screwdriver or similar tool may be inserted into the slot 96 and turned so that the screw thread 92 is advanced in the helical groove 94. Movement of the stopper 60 will terminate when a flange 66' abuts an upstanding flange 46'.

Figure 2:
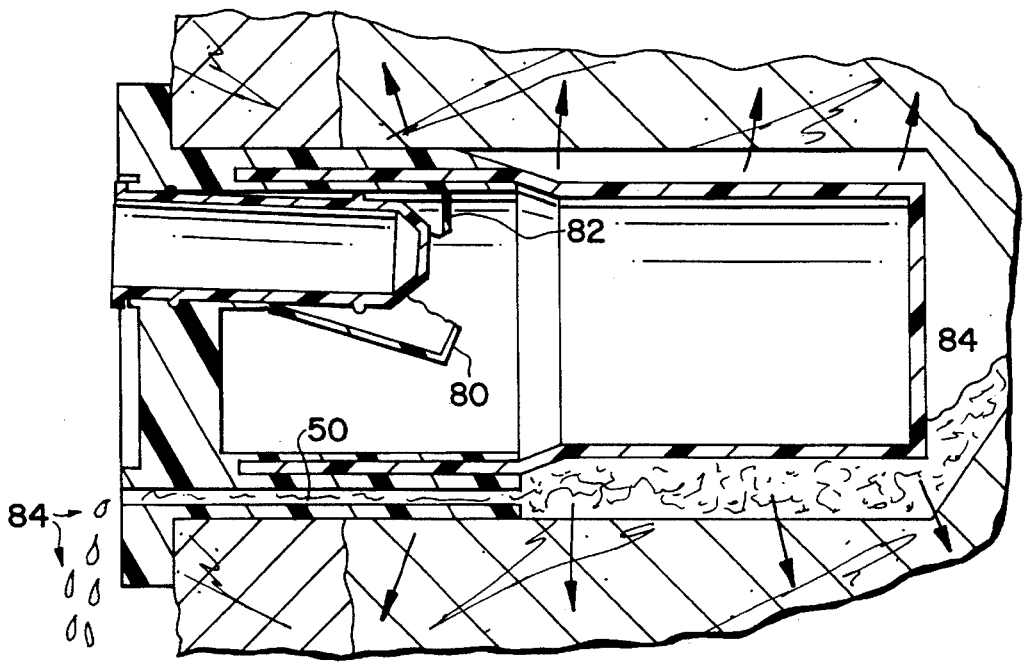
FIG. 2 is a side sectional view showing the tap or plug of FIG. 1 in an active state.

As the stopper 60 is forced in the direction of the arrow 76, the secondary chamber walls 34 and 36 are broken into portions 80 and 82 as shown in FIG. 2. The provision of the notch or kerf 40 assists in this operation. At the same time, the secondary chamber wall 34 is bent at the hinge location 38 so that the second chemical agent is permitted to pass from the secondary cavity 48 into the primary cavity 24. The first and second chemical agents are, therefore, allowed to mix and produce a gas which diffuses through the walls of the gas permeable container 10, as represented by the arrows in FIG. 2, and permeates the tree tissue, thereby stimulating and dramatically increasing the production and excretion of fluid in the form of sap 84. The sap 84, thus produced, is passed through the bore 50 and may then be collected.

The sap flow stimulating tap or plug shown in FIG. 4 does not itself dispense sap but rather is intended for use together with, for example, one or more of the tubes which are typically used to collect sap. The tap or plug shown in FIG. 4 is identical in all respects to the tap or plug shown in FIGS. 1–3 except that, in the tap or plug shown in FIG. 4, there is no bore corresponding to the bore 50 shown in FIGS. 1, 2 and 3. The gas which diffuses through the walls of the hollow container of the tap or plug shown in FIG. 4 is instead used to increase the production and excretion of sap which is then collected at another location on the tree by a sap dispensing tap of any sort.

Figure 7:
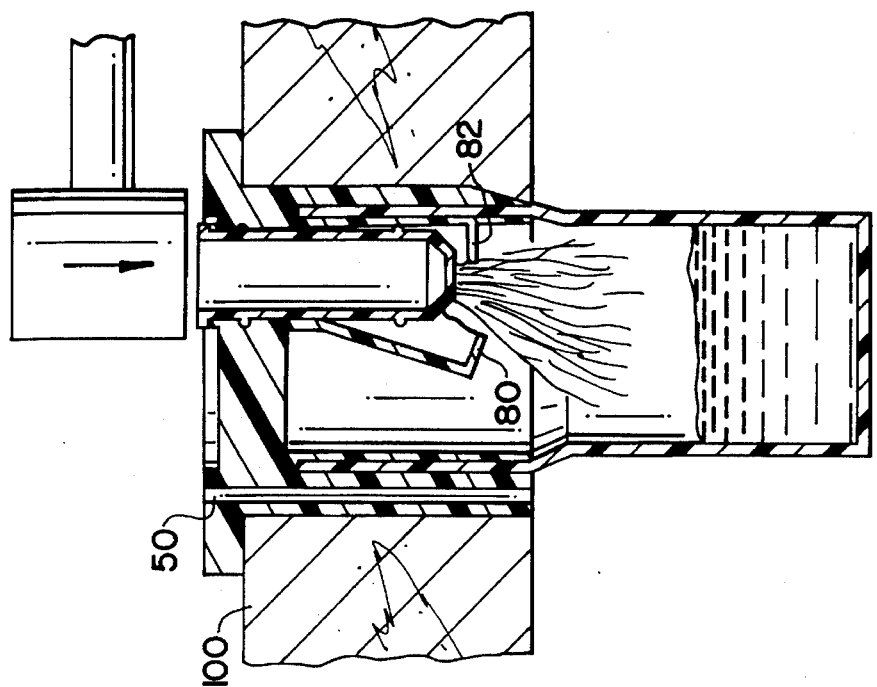
FIGS. 7–10 illustrate an alternative way of using the tap or plug shown in FIGS. 1–3.
Figure 8:
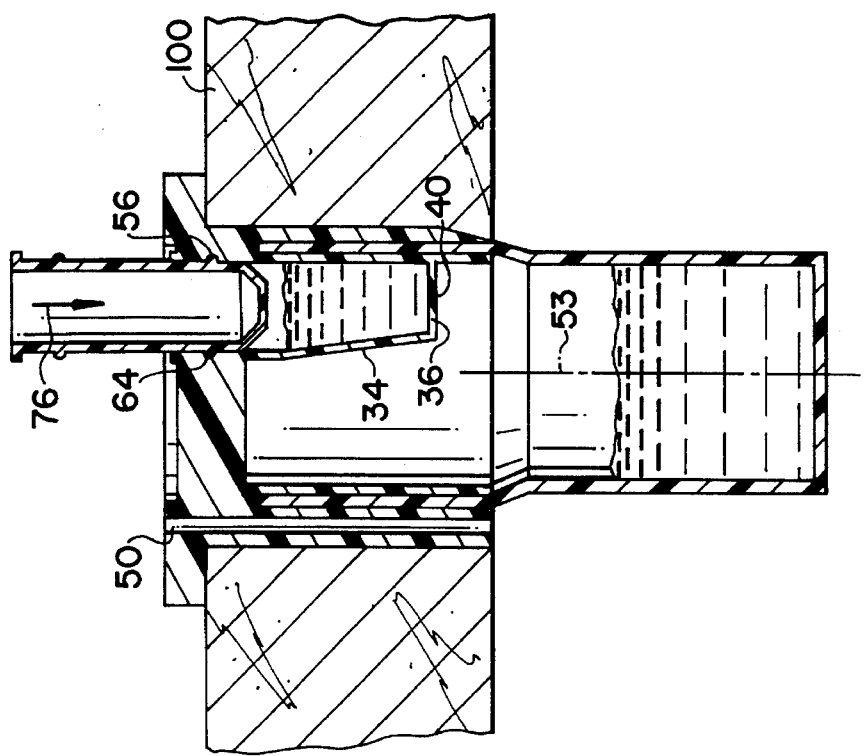

An alternative way of using the tap or plug of this invention is illustrated in FIGS. 7–10. The structure of the tap or plug itself shown in FIGS. 7–10 is identical to that of the tap or plug shown in FIGS. 1–3. However, in the procedure represented in FIGS. 7–10, the tap or plug is temporarily inserted into a bore formed in a transportation pallet 100 used for transporting one or more of the taps or plugs to a desired location as shown in FIG. 7. A hammer or mallet is used to apply an impact force to the stopper as shown in FIG. 8 to permit the first and second chemical agents to mix while the tap or plug is received in the bore formed in the transportation pallet 100. Some gas will be produced at this time.

Figure 10:
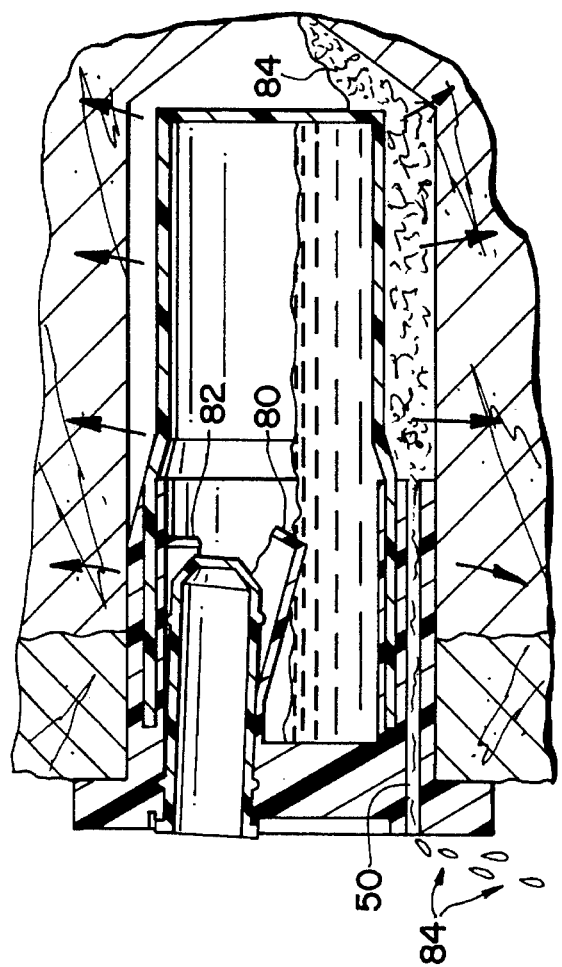
Figure 9:
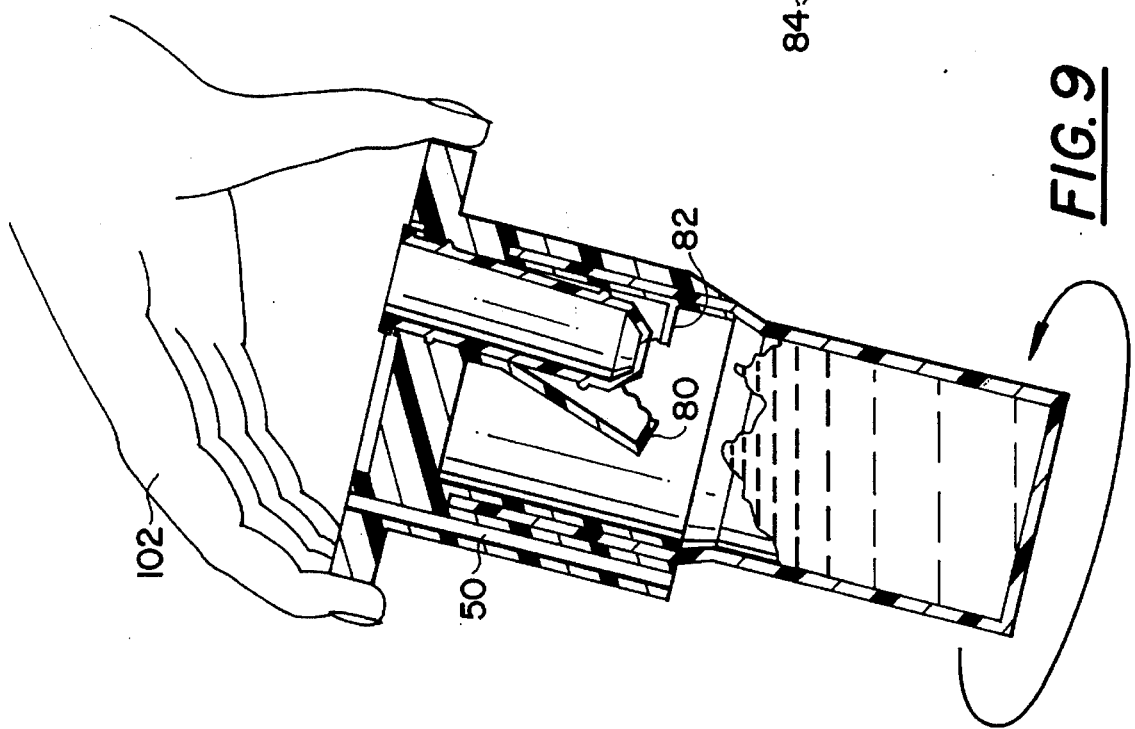

Once the pallet has been brought to the appropriate location, each tap or plug carried by the pallet can be removed, by hand, and shaken as shown in FIG. 9 to once again initiate production of gas; FIG. 9 shows the hand 102 of a user as being used to shake the tap or plug, but the mixture in the tap or plug can be agitated in any particularly desired way. After the mixture is agitated in this way, the tap or plug is then inserted into a bore formed in a tree in the same way as the embodiment shown in FIGS. 1–3 and releases gas, produced as a result of the agitation, which permeates the tree tissue; such is represented in FIG. 10.

It is to be understood that although preferred embodiments of the invention have been described in detail, various other embodiments and variants may be within the spirit and scope of the present invention. Such embodiments and variants are intended to be covered by the following claims.

What is claimed is:

1. A tap for insertion into a bore comprising:

a hollow container having a side wall, an open end and a closed end;

a plug head closing off said open end of said hollow container to define a primary cavity within said hollow container including a first chemical agent, said plug head having communicating means provided therein for communicating an interior of said bore with an outside of said plug head; and a stopper received in an opening to a secondary cavity in said plug head to close off said secondary cavity, said secondary cavity containing a second chemical agent;

said stopper moving into said secondary cavity, as an impact force is applied to said stopper, to combine the first and second chemical agents so that a gas, generated by combination of said chemical agents, diffuses through said side wall and causes fluid to pass from said interior of said bore, through said communicating means and to the outside of said plug head.

2. A tap as defined in claim 1, and further comprising means for defining an inactive position of said stopper in the opening to said secondary cavity and an active position of said stopper in said opening.

3. A tap as defined in claim 2, and further comprising walls defining said secondary cavity in said plug head, wherein said walls defining said secondary cavity in said plug head break as said stopper is moved by said impact force from said inactive position to said active position in said opening to combine the first and second chemical agents.

4. A tap as defined in claim 3, wherein the means for defining the inactive and active positions of said stopper in the opening include a groove provided in said opening and protrusions provided on said stopper receivable within said groove.

5. A tap as defined in claim 1, wherein said communicating means is formed by at least one bore extending throughout an axial length of said plug head.

6. A tap as defined in claim 3, wherein one of said walls defining said secondary cavity is at least partially tapered to facilitate breaking of said walls as said stopper is moved from said inactive position to said active position.

7. A tap as defined in claim 4, wherein the means for defining the active position of said stopper in said opening further includes an upstanding flange surrounding said opening to the secondary cavity and a radially outwardly extending flange located at one end of said stopper abutting the upstanding flange.

8. A tap as defined in claim 1, wherein said plug head includes a radially outwardly extending flange which abuts against an outer surface through which said tap is inserted.

9. A tap as defined in claim 2, wherein said communicating means is formed by at least one bore extending throughout an axial length of said plug head.

10. A tap as defined in claim 3, wherein said communicating means is formed by at least one bore extending throughout an axial length of said plug head.

11. A tap as defined in claim 4, wherein said communicating means is formed by at least one bore extending throughout an axial length of said plug head.

12. A tap as defined in claim 6, wherein said communicating means is formed by at least one bore extending throughout an axial length of said plug head.

13. A tap as defined in claim 7, wherein said communicating means is formed by at least one bore extending throughout an axial length of said plug head.

14. A tap as defined in claim 8, wherein said communicating means is formed by at least one bore extending throughout an axial length of said plug head.

15. A tap as defined in claim 4, wherein one of said walls defining said secondary cavity is at least partially tapered to facilitate breaking of said walls as said stopper is moved from said inactive position to said active position.

16. A tap as defined in claim 7, wherein one of said walls defining said secondary cavity is at least partially tapered to facilitate breaking of said walls as said stopper is moved from said inactive position to said active position.

17. A tap as defined in claim 8, and further comprising walls defining said secondary cavity in said plug head, wherein one of said walls defining said secondary cavity is at least partially tapered to facilitate breaking of said walls as said stopper is moved from said inactive position to said active position.

18. A tap as defined in claim 1, and further comprising barbs provided on a radially outer surface of said plug head to retain said tap in said bore.

19. A tap as defined in claim 1, and further comprising a screw thread formed on said stopper and receivable in a helical groove formed in said opening to said secondary cavity.

20. A tap for insertion into a bore comprising:
a hollow container having a side wall, an open end and a closed end;

a plug head closing off said open end of said hollow container to define a primary cavity within said hollow container including a first chemical agent; and a stopper received in an opening to a secondary cavity in said plug head to close off said secondary cavity, said secondary cavity containing a second chemical agent;

said stopper moving into said secondary cavity, as an impact force is applied to said stopper, to combine the first and second chemical agents so that a gas, generated by combination of said chemical agents, diffuses through said side wall.

21. A tap as defined in claim 20, and further comprising means for defining an inactive position of said stopper in the opening to said secondary cavity and an active position of said stopper in said opening.

22. A tap as defined in claim 21, and further comprising walls defining said secondary cavity in said plug head, wherein said walls defining said secondary cavity in said plug head break as said stopper is moved by said impact force from said inactive position to said active position in said opening to combine the first and second chemical agents.

* * * * *